US012118899B2

(12) United States Patent
Wise et al.

(10) Patent No.: US 12,118,899 B2
(45) Date of Patent: *Oct. 15, 2024

(54) POP-UP GREETING CARD WITH TAB SUPPORT OF A LASER-CUT, SLICE-FORM POP-UP ELEMENT

(71) Applicant: LovePop, Inc., Boston, MA (US)

(72) Inventors: John Perry Wise, Cambridge, MA (US); Robin Sebastian Koske Rose, Cambridge, MA (US)

(73) Assignee: LOVEPOP, INC., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,805

(22) Filed: Jun. 5, 2023

(65) Prior Publication Data

US 2023/0316955 A1 Oct. 5, 2023

Related U.S. Application Data

(63) Continuation of application No. 17/375,470, filed on Jul. 14, 2021, now Pat. No. 11,705,021, which is a (Continued)

(51) Int. Cl.
*G09F 1/06* (2006.01)
*B42D 15/04* (2006.01)
(Continued)

(52) U.S. Cl.
CPC ............ *G09F 1/06* (2013.01); *B42D 15/042* (2013.01); *G09F 1/08* (2013.01); *G09F 1/10* (2013.01)

(58) Field of Classification Search
CPC ..... G09F 1/06; G09F 1/08; G09F 1/10; B42D 15/042
See application file for complete search history.

(56) References Cited

U.S. PATENT DOCUMENTS 674,682 A 5/1901 Kersey
729,553 A 6/1903 Demmon
(Continued)

FOREIGN PATENT DOCUMENTS

GB 2244024 A 11/1991
GB 2467115 A 7/2010
(Continued)

OTHER PUBLICATIONS

Colorpop Cards Cardinal Bird Pop Up Card, Date First Available Nov. 13, 2018, https:www.amazon.com Colorpop Cardinal greeting handmade Animals.

(Continued)

*Primary Examiner* — Gary C Hoge
(74) *Attorney, Agent, or Firm* — Polsinelli PC

(57) ABSTRACT

An article comprising a pop-up card is provided. The article comprises a single sheet of paper including a single crease and separating the sheet of paper into a left panel and a right panel, wherein the sheet is in a closed position when folded along the crease, and wherein the sheet is in the open position when not folded along the crease, a pop-up slice-form element coupled to said sheet, wherein the slice-form includes a first plurality of slice-form elements perpendicular to a second plurality of slice-form elements when in the open position, wherein the slice-form element comprises a first and last slice-form element each with a distal tab, and wherein in the open position the pop-up slice-form element is displayed as a three-dimensional configuration, and in the closed position said pop-up slice-form element folds together into a flat configuration.

20 Claims, 22 Drawing Sheets

Related U.S. Application Data continuation of application No. 16/432,297, filed on Jun. 5, 2019, now Pat. No. 11,081,025, which is a continuation of application No. 15/427,827, filed on Feb. 8, 2017, now Pat. No. 10,339,838, which is a continuation of application No. 14/971,625, filed on Dec. 16, 2015, now Pat. No. 9,601,033.

(60) Provisional application No. 62/092,796, filed on Dec. 16, 2014.

(51) Int. Cl.
*G09F 1/08* (2006.01)
*G09F 1/10* (2006.01)

(56) References Cited

U.S. PATENT DOCUMENTS

| | | | | |
|---|---|---|---|---|
| 930,108 | A * | 8/1909 | Walcutt | A63H 33/38 119/431 |
| 1,052,187 | A * | 2/1913 | Stranders | G09F 1/06 40/539 |
| 1,194,678 | A * | 8/1916 | Stranders | G09F 1/06 40/539 |
| 1,541,002 | A | 6/1925 | Shramek | |
| 1,854,225 | A | 4/1932 | Benjamin et al. | |
| 1,891,011 | A | 12/1932 | Purdy | |
| 1,913,797 | A | 6/1933 | Dulin et al. | |
| 3,430,761 | A | 3/1969 | Pelkey et al. | |
| 4,024,656 | A | 5/1977 | Farnsworth | |
| 4,319,418 | A | 3/1982 | Transport | |
| 4,349,973 | A * | 9/1982 | Penick | G09F 1/06 446/148 |
| D283,231 | S | 4/1986 | Bradenburger | |
| 4,620,842 | A | 11/1986 | Wang | |
| 4,826,211 | A | 5/1989 | Sinnott et al. | |
| 4,869,702 | A | 9/1989 | Derby, III | |
| 5,096,751 | A | 3/1992 | Duchek | |
| 5,259,133 | A | 11/1993 | Burtch | |
| 5,261,172 | A | 11/1993 | Rowley | |
| 5,317,823 | A | 6/1994 | Brunt, II | |
| 5,387,108 | A | 2/1995 | Crowell | |
| 5,416,993 | A | 5/1995 | Shields | |
| 5,450,680 | A | 9/1995 | Bromberg | |
| D368,276 | S | 3/1996 | Buzby | |
| 5,551,730 | A * | 9/1996 | Barreca | B42D 15/042 283/117 |
| 5,613,612 | A | 3/1997 | Davault | |
| 5,658,620 | A | 8/1997 | Ross | |
| 5,738,221 | A | 4/1998 | Van et al. | |
| 5,746,689 | A | 5/1998 | Murphy | |
| 5,761,836 | A | 6/1998 | Dawson | |
| 5,884,770 | A | 3/1999 | Galm | |
| 5,933,989 | A | 8/1999 | Volkert et al. | |
| 5,937,553 | A | 8/1999 | Maran | |
| 5,943,800 | A * | 8/1999 | Rose | G09F 1/06 446/148 |
| 5,947,281 | A | 9/1999 | Kaneff | |
| 5,954,194 | A | 9/1999 | Simpson | |
| 5,971,157 | A | 10/1999 | Howell et al. | |
| 6,059,101 | A | 5/2000 | Gambardella et al. | |
| 6,106,023 | A | 8/2000 | Sud et al. | |
| D432,570 | S | 10/2000 | Donaldson | |
| 6,267,233 | B1 | 7/2001 | Stern et al. | |
| 6,279,739 | B1 | 8/2001 | Moore et al. | |
| 6,311,142 | B1 | 10/2001 | Glassner | |
| 6,311,418 | B1 * | 11/2001 | Crowell | G09F 1/08 283/117 |
| 6,453,800 | B1 | 9/2002 | Chen | |
| 6,505,737 | B1 | 1/2003 | Sherman | |
| 6,640,473 | B1 | 11/2003 | Shenk | |
| 6,643,962 | B1 | 11/2003 | Panec et al. | |
| 6,719,189 | B1 | 4/2004 | Malerba | |
| 6,877,263 | B2 | 4/2005 | Clark | |
| 6,966,135 | B1 | 11/2005 | McDonald | |
| D514,120 | S | 1/2006 | Chan | |
| 7,490,425 | B2 | 2/2009 | Crowell et al. | |
| 8,228,327 | B2 | 7/2012 | Hendrickson et al. | |
| 9,475,333 | B2 * | 10/2016 | Yeh | B44C 5/06 |
| 9,524,658 | B1 | 12/2016 | Wise et al. | |
| 9,601,033 | B2 | 3/2017 | Wise et al. | |
| D802,661 | S | 11/2017 | Salatandre | |
| 9,836,997 | B1 * | 12/2017 | Brandrup | G09F 1/06 |
| 9,842,516 | B2 * | 12/2017 | Yeh | B44C 5/00 |
| D831,108 | S | 10/2018 | Dennis | |
| D852,882 | S | 7/2019 | Rose | |
| 10,339,838 | B2 | 7/2019 | Wise et al. | |
| 10,388,189 | B2 | 8/2019 | Rose et al. | |
| D867,448 | S | 11/2019 | Yue | |
| 11,081,025 | B2 | 8/2021 | Wise et al. | |
| 2003/0097773 | A1 * | 5/2003 | Oh | G09F 1/06 40/124.08 |
| 2003/0230515 | A1 | 12/2003 | Mouyal | |
| 2005/0284927 | A1 | 12/2005 | Wilen | |
| 2006/0101678 | A1 | 5/2006 | Wilen | |
| 2007/0017133 | A1 * | 1/2007 | Crowell | G09F 1/06 40/610 |
| 2007/0293118 | A1 | 12/2007 | Prescott | |
| 2008/0295374 | A1 * | 12/2008 | Bergland | G09F 1/065 40/607.1 |
| 2012/0266504 | A1 * | 10/2012 | Michlin | B42D 15/042 40/124.08 |
| 2012/0285055 | A1 | 11/2012 | Glass et al. | |
| 2012/0297650 | A1 | 11/2012 | Burley | |
| 2013/0139420 | A1 * | 6/2013 | Rubar | G09F 1/06 493/54 |
| 2013/0232828 | A1 | 9/2013 | Qiao et al. | |
| 2013/0302540 | A1 | 11/2013 | Vinecombe | |
| 2014/0209496 | A1 | 7/2014 | Flynn et al. | |
| 2014/0216982 | A1 | 8/2014 | Boyer | |
| 2015/0314950 | A1 | 11/2015 | Lopez et al. | |
| 2015/0332611 | A1 * | 11/2015 | Yeh | B44C 5/06 40/124.08 |
| 2016/0365009 | A1 * | 12/2016 | Wise | G09F 1/10 |
| 2017/0273253 | A1 * | 9/2017 | Yeh | A01G 9/026 |
| 2018/0102070 | A1 | 4/2018 | Yeh | |
| 2018/0102071 | A1 | 4/2018 | Yeh | |

FOREIGN PATENT DOCUMENTS

| | | | |
|---|---|---|---|
| JP | 2000141954 | A | 5/2000 |
| WO | WO-2007149110 | A1 | 12/2007 |

OTHER PUBLICATIONS

Creative Park, http:cp.c ij.com en contents CNT-0005840 index.html, accessed Jun. 6, 2016.

Creative Popup Cards, http:www.creativepopupcards.com, accessed Jun. 6, 2016.

Hallmark, last accessed on Jan. 9, 2019, https:www.hallmark.com cardskireeting-cardspizza-my-heart-birthday-card-799LAD1525.html.

https://sites.google.com/site/kagisippopopupcards/home enceree-template_eng?fbclid=IwAR2fJLXMToBnu DAcny-Y7KklelTiygQ8rvHxr1 Vyikci73k 1 Ts6Mp0UKL8Q.

https://sites.google.com/site/kagisiroopopupeards/home_eng/free-template_eng?fbclid=IwAR2fJLXMToBnuDAcny-Y7KklelTiygQ8rvHxr1cNyikq73k1Ts6Mp0UkL8O.

https://toothpicnations.co.uk/my-blog/?p=1649.

https://wvvw.youtube.com/watch?v=Q7ZuCIOTQ6Zq.

https://www.amazon.com/Paper-Love-Flamingo-Valentines-Anniversary/dp/B08X8TKJ7L.

https://www.amazon.com/Paper-Love-Greeting-Birthday-Graduation/dp/B088JZK6FQ.

https://www.amazon.com/Paper-Love-Greeting-Graduation-Anniversary/dp/B084SBT9PW.

https://www.amazon.com/Paper-Love-Handmade-Greeting-Occasion/dp/B0946CYH1W.

https://www.cnbc.com/2018/05/23/shark-tank-backed-lovepop-raised-12m-to-se11-3d-wedding-invites.html.

(56) References Cited

OTHER PUBLICATIONS https://www.extremepapercrafting.com/2008/12/sliceform-christmas-tree-tutorial.html.
https://www.facebook.com/kagisippo.
https://www.youtube.comiwatch?v=-2JvzFQCLKE.
https://www.youtube.com/watch?v=ErG071fRIM.
https://www.youtube.com/watch?v=2L1mz9B8HAk.
https://www.youtube.com/watch?v=a1aQFKfKNuU.
https://www.youtube.com/watch?v=ctF Lbuq F51.
https://www.youtube.com/watch?v=Q7ZuOOTQ6Zg.
https://www.youtube.com/watch?v=vuc9aLT wAU.
https://www.youtube.com/watch?v=x09u8dTb81.
https://www.youtube.corn/watch?v=0qxvkMiBa54&list=PLsklyfOZ6Omla0LIKEiwijIFOYFSiJ1dKsP&index=8.

* cited by examiner

POP-UP GREETING CARD WITH TAB SUPPORT OF A LASER-CUT, SLICE-FORM POP-UP ELEMENT

CROSS-REFERENCE TO RELATED APPLICATIONS

This application is a continuation of U.S. patent application Ser. No. 17/375,470, filed Jul. 14, 2021 and entitled POP-UP GREETING CARD WITH TAB SUPPORT OF A LASER-CUT, SLICE-FORM POP-UP ELEMENT, which is a continuation of U.S. patent application Ser. No. 16/432,297, filed Jun. 5, 2019 and entitled POP-UP GREETING CARD WITH TAB SUPPORT OF A LASER-CUT, SLICE-FORM POP-UP ELEMENT, which is a continuation of U.S. patent application Ser. No. 15/427,827, filed on Feb. 8, 2017 and entitled POP-UP GREETING CARD WITH TAB SUPPORT OF A LASER-CUT, SLICE-FORM POP-UP ELEMENT, which is a continuation of U.S. patent application Ser. No. 14/971,625, filed on Dec. 16, 2015 and entitled POP-UP GREETING CARD WITH TAB SUPPORT OF A LASER-CUT, SLICE-FORM POP-UP ELEMENT, which claims priority to U.S. Provisional Patent Application No. 62/092,796 filed on Dec. 16, 2014 and entitled POP-UP GREETING CARD WITH TAB SUPPORT OF A LASER-CUT, SLICE-FORM POP-UP ELEMENT AND A METHOD OF ASSEMBLY. Each of these applications is incorporated by reference herein in its entirety.

TECHNICAL FIELD

The technical field relates generally to the field of pop-up greeting cards and, more specifically, relates to the field of paper engineering.

BACKGROUND

Although usually given on special occasions such as birthdays, Christmas or other holidays, a greeting card, which comprises an illustrated piece of card or high quality paper featuring an expression of friendship or other sentiment, may also be sent to convey thanks or express other feelings. Many different styles and designs for greeting cards have been developed over the years and can range from the ordinary to the inspirational. Some designs seek to heighten the appeal and presentation by offering some mechanical movement inside the card itself. For example, some greeting cards may include a pop-up element that, when opened, folds out into a three-dimensional figure. Additionally, some cards available on the market can be assembled into various ornamental objects. Still other techniques have been used by card makers to enhance the card's ability to convey a particular meaning or feeling through the card's design.

While card designers have made attempts at incorporating pop-up elements, paper folding, cut-outs, and assembling techniques to improve the appeal of greeting cards, these attempts have had their drawbacks. Expense can be a limiting factor. Fancy or intricate card designs may require expensive materials and/or special treatment and, hence, increased costs due to limited production runs. Therefore, cards with fancy or intricate designs may not be cost feasible for greeting card manufacturers. Also, because of the geometry behind how pop-up elements are raised when the greeting card is opened, conventional pop-greeting cards are limited in the location in which said pop-up elements can be placed on the greeting card. This restricts the creative process for card designers and can lead to greeting cards that are not as appealing to consumers. Further, because of the mechanical requirements behind how popup elements are raised when the greeting card is opened, conventional pop-up greeting cards require multiple pieces of paper to form the base for the greeting card. This increases costs in manufacturing the pop-up greeting card, increases the complexity of the greeting card and limits the ability of the card designers to control the materials used to make the greeting card. Additionally, conventional pop-up cards often use string to mechanically raise pop-up elements when the greeting card is opened. Again, this increases costs and complexity of the pop-up greeting card, and therefore limits the ability to make the greeting card.

Therefore, a need exists to overcome the problems with the prior art as discussed above, and particularly for a more efficient way of designing and manufacturing pop-up greeting cards in a manner that is appealing to the consumer.

SUMMARY

A new pop-up greeting card, and method of making the same, is provided. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an article is provided that solves the above-described problems. The article comprises pop-up card, including a single sheet of paper including a single crease and separating the sheet of paper into a left panel and a right panel, wherein the sheet is in a closed position when folded along the crease, and wherein the sheet is in the open position when not folded along the crease, a pop-up slice-form element coupled to said sheet, wherein the slice-form includes a first plurality of slice-form elements perpendicular to a second plurality of slice-form elements when in the open position, wherein the first plurality of slice-form elements comprises: a) a first slice-form element with a distal tab perpendicular to the first slice-form element when in the open position, wherein said tab is coupled to the left panel, and b) a last slice-form element with a distal tab perpendicular to the last slice-form element when in the open position, and wherein said tab is coupled to the right panel, wherein the second plurality of slice-form elements comprises: a) a first slice-form element with a distal tab perpendicular to the first slice-form element when in the open position, wherein said tab is coupled to the right panel, and b) a last slice form element with a distal tab perpendicular to the last slice-form element when in the open position, and wherein said tab is coupled to the left panel, and wherein in the open position the pop-up slice-form element is displayed as a three-dimensional configuration, and in the closed position said pop-up slice-form element folds together into a flat configuration.

DETAILED DESCRIPTION

Figure 1B:
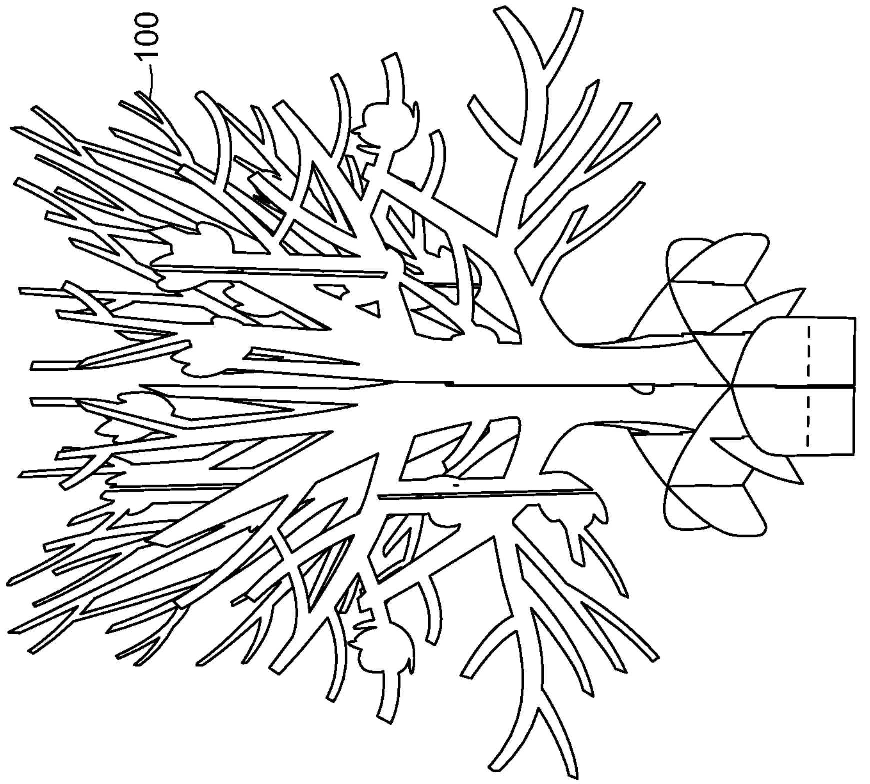
FIGS. 1A-1C depict slice-form elements that comprise a tree-like pop-up element, according to an example embodiment.

The following detailed description refers to the accompanying drawings. Wherever possible, the same reference numbers are used in the drawings and the following description to refer to the same or similar elements. While embodiments of the claimed subject matter may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the claimed subject matter. Instead, the proper scope of the claimed subject matter is defined by the appended claims.

The claimed subject matter improves over the prior art by providing a pop-up greeting card that is efficiently designed and manufactured in a manner that is appealing to the consumer. The claimed subject matter leverages current computer aided design to produce an inexpensively manufactured pop-up greeting card that also allows for fancy and intricate card designs that requires no special treatment. This feature increased the cost feasibility of pop-up greeting cards for greeting card manufacturers. The claimed subject matter also improves over the prior art by allowing pop-up elements be placed on a larger variety of locations on the greeting card while still allowing the pop-up elements to be raised when the greeting card is opened. This feature provides greater freedom for card designers during the creative process. Further, the claimed subject matter allows for the placement pop-up elements on a greeting card comprising a single piece of paper that forms the base for the greeting card. This decreases costs in manufacturing the pop-up greeting card, and decreases the complexity of the greeting card. Additionally, the claimed subject matter eliminates the necessity of string used by conventional pop-up cards to mechanically raise pop-up elements when the greeting card is opened. Again, this decreases costs and complexity of the pop-up greeting card.

The claimed subject matter draws upon the use of slice-forms to depict or emulate three-dimensional shapes. Slice-forms are geometric models constructed from interlocking sets of planar pieces. The basic idea behind slice-form construction is the creation of two sets of slotted pieces that intersect at right angles, linking the two sets together to form models of surfaces and solids. Slice-form models may be created in almost any media, including paper, wood, or plastic and may be formed or cut using a laser cutter (hence the term laser cut slice-form). Software, such as computer aided design software, may be used to created slice-form models based on existing surfaces or solids. The basic idea behind said software is that the user can specify a solid form or surface, and the software may produce a set of slice-form pieces that can be assembled into a semi or full-scale slice-form model.

Figure 1A:
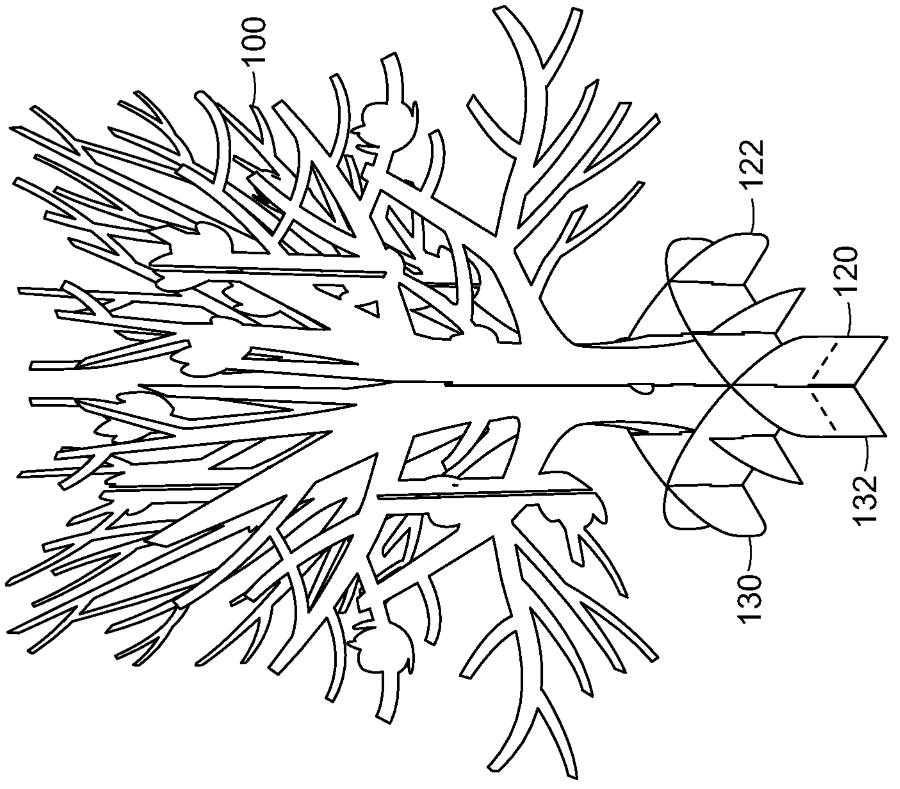
Figure 1C:
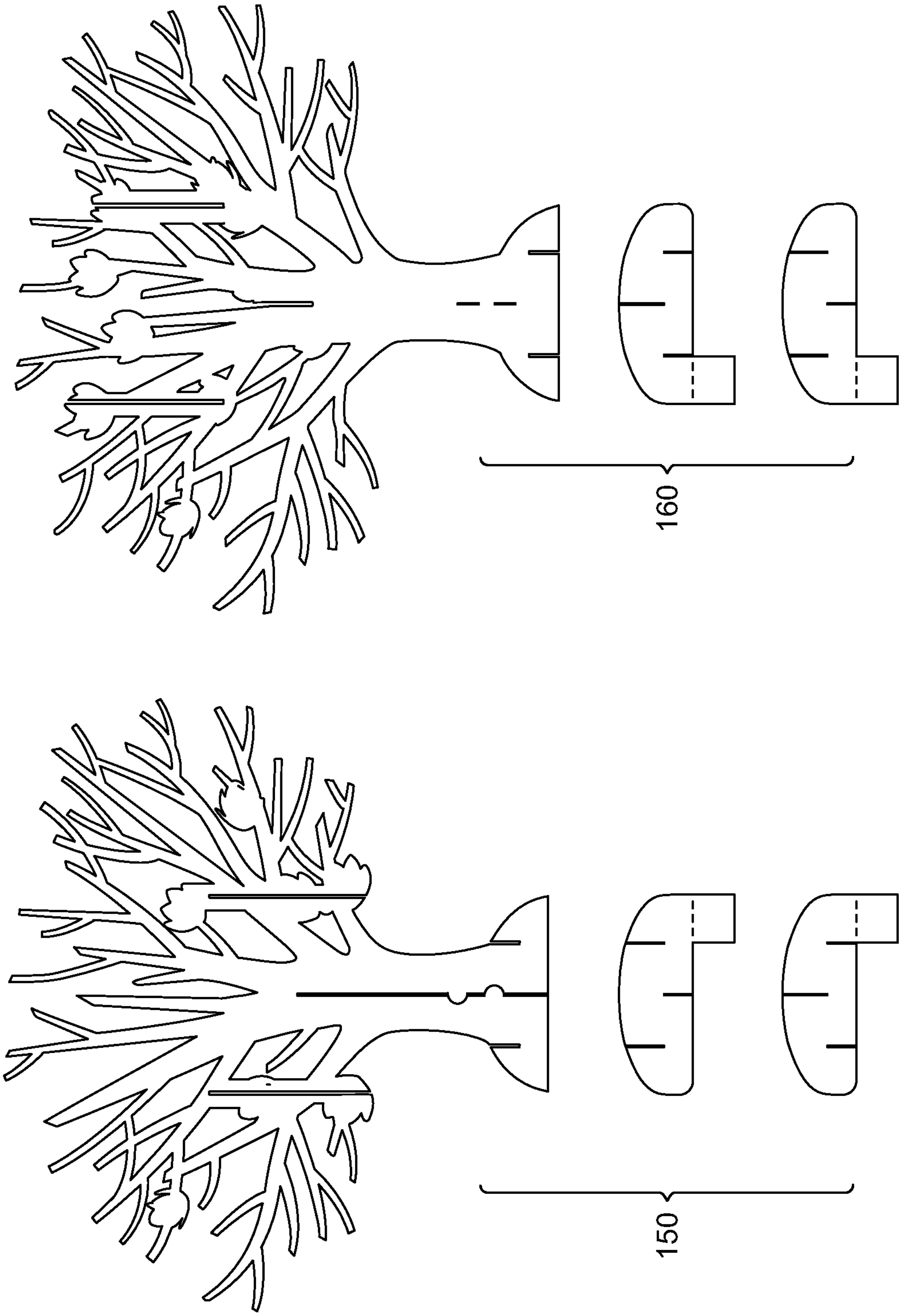

FIGS. 1A-1C depict slice-form elements that comprise a tree-like pop-up element 100, according to an example embodiment. FIG. 1A shows a first perspective view of the treelike pop-up element 100 when constructed and when displayed in a three-dimensional configuration. FIG. 1B shows a second perspective view of the tree-like pop-up element 100 when constructed and when displayed in a three-dimensional configuration. FIG. 1C shows the components that comprise the tree-like pop-up element 100, when constructed. The slice-forms, or slice-form elements, shown include a first plurality of slice-form elements 150 that, when constructed, are perpendicular to a second plurality of slice-form elements 160.

FIG. 1A shows that when constructed, there is a first (or left-most) slice-form element 120 of the first plurality of slice-form elements 150, and there is a last (or right-most) slice-form element 122 of the first plurality of slice-form elements 150. Also, there is a first (or left-most) slice-form element 130 of the second plurality of slice-form elements 160, and there is a last (or right-most) slice-form element 132 of the second plurality of slice-form elements 160. Note that the first (or left-most) slice-form element 120 intersects or is coupled with the last (or right-most) slice-form element 132 at a vertex that is located along an outer circumference of the tree-like pop-up element 100.

Figure 2A:
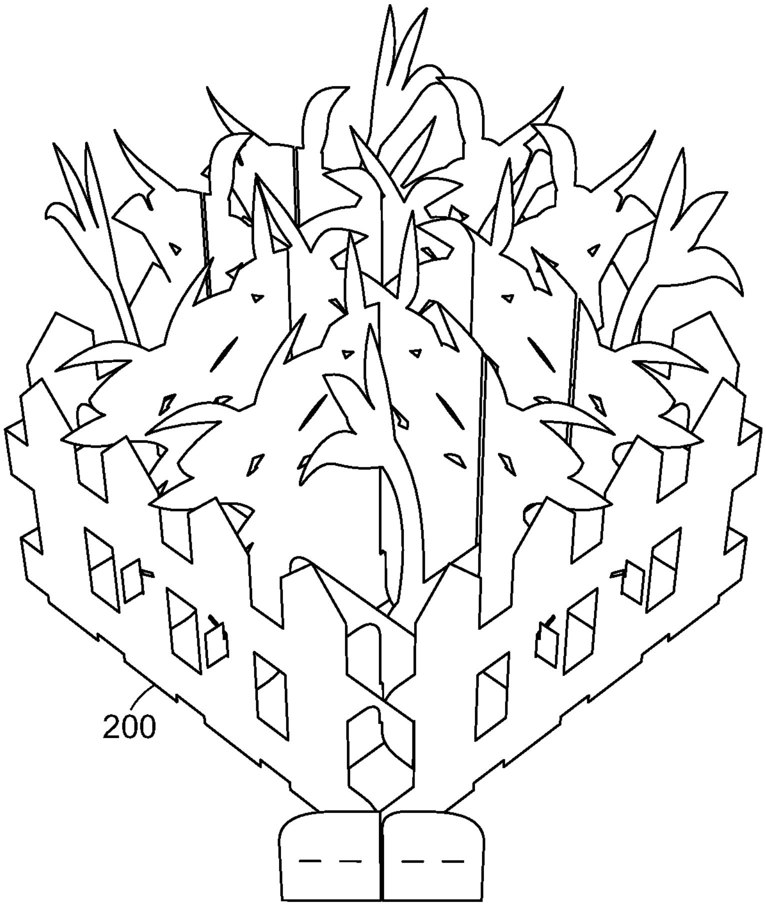
FIGS. 2A-2B depict slice-form elements that comprise a garden-like pop-up element, according to an example embodiment.
Figure 2B:
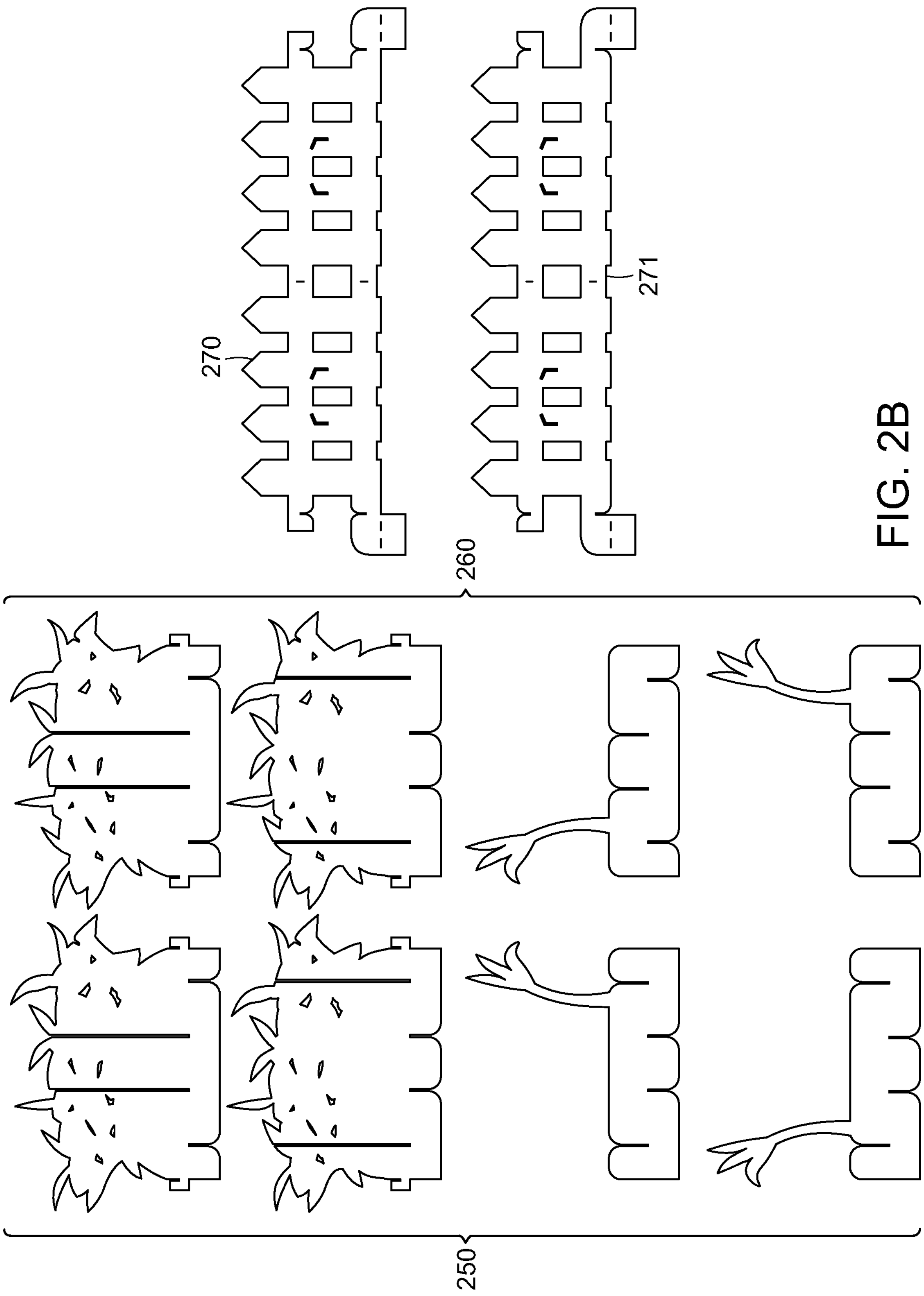

FIGS. 2A-2B depict slice-form elements that comprise a garden-like pop-up element 200, according to an example embodiment. FIG. 2A shows a first perspective view of the garden-like pop-up element 200 when constructed and when displayed in a three-dimensional configuration. FIG. 2B shows the components that comprise the garden-like popup element 200, when constructed. The slice-forms, or slice-form elements, shown include a first plurality of slice-form elements 250 that, when constructed, are perpendicular to a second plurality of slice-form elements 260. Elements 270 and 271 comprise single slice-form elements that fold to form a ninety-degree angle when constructed. When folded the elements 270, 271 include a first portion and a second portion. As such, when constructed, elements 270 and 271 include a first portion that belong to the first plurality of slice-form elements and a second portion that belongs to the second plurality of slice-form elements.

Figure 3B:
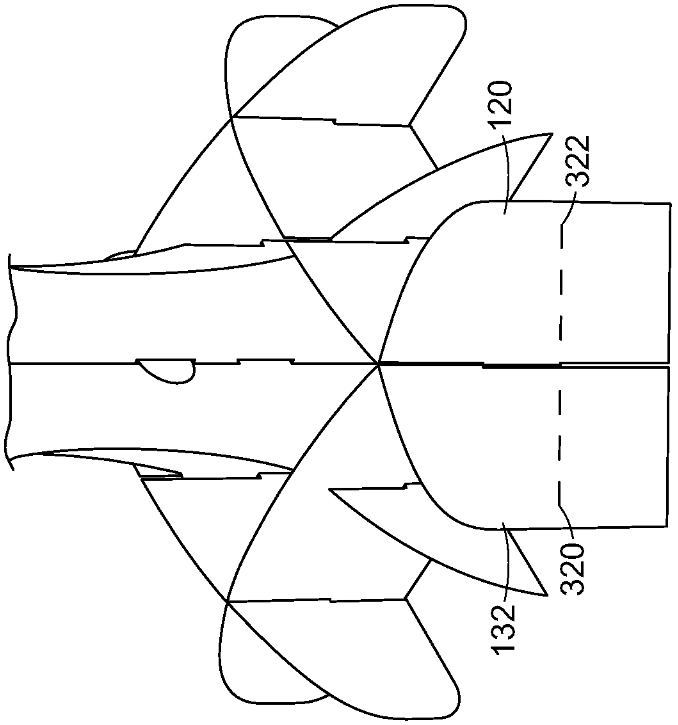
FIGS. 3A-3D depict the tab structures of the tree-like pop-up element, according to an example embodiment.
Figure 3A:
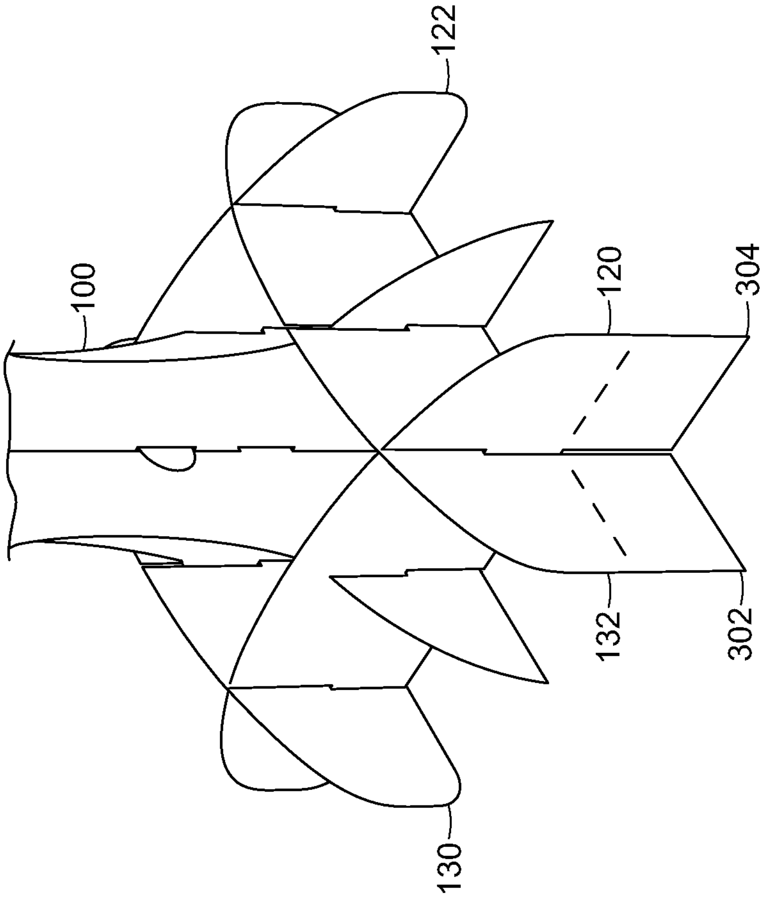

FIGS. 3A-3D depict the tab structures of the tree-like pop-up element 100, according to an example embodiment. FIG. 3A shows that when constructed, the first (or leftmost) slice-form element 120 of the first plurality of slice-form elements 150, is parallel to and does not intersect with last (or right-most) slice-form element 122 of the first plurality of slice-form elements 150. Also, the first (or left-most) slice-form element 130 of the second plurality of slice-form elements 160, is parallel to and does not intersect with the last (or rightmost) slice-form element 132 of the second plurality of slice-form elements 160. The first (or left-most) slice-form element 120 does, however, intersects with the last (or right-most) slice-form element 132 at a vertex that is located along an outer circumference of the tree-like pop-up element 100.

Figure 3C:
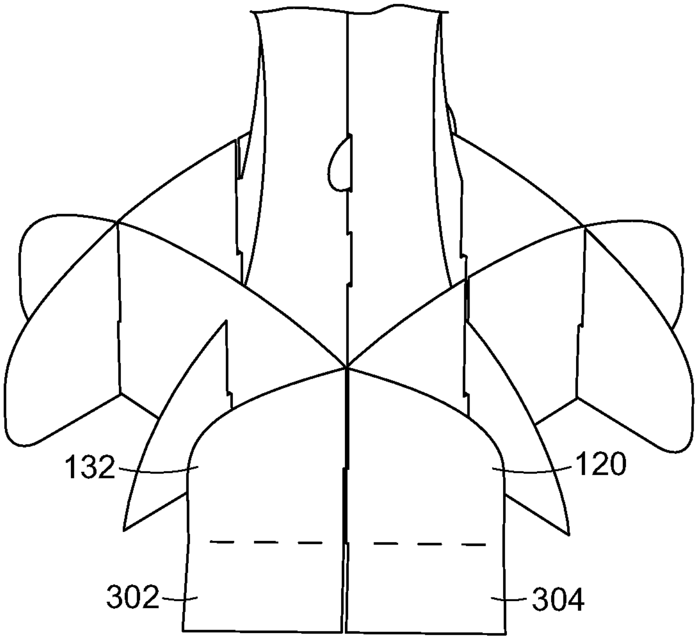

Note that the first (or left-most) slice-form element 120 includes a tab 304 that extends downwards and includes a crease 322. Also, the last (or right-most) slice-form element 132 includes a tab 302 that extends downwards and includes a crease 320. FIG. 3C shows that tab 304 has been folded along the crease 322 such that the tab is perpendicular to the first (or left-most) slice-form element 120. Also, tab 302 has been folded along crease 320 such that the tab is perpendicular to the last (or right-most) slice-form element 132. Said tabs described above may be referred to as "distal tabs"

because each tab is located either on the end of a first (or leftmost) slice-form element or on the end of a last (or right-most) slice-form element. Hence, a tab is located on the farthest end, or distally, of the slice-form element on which it is located.

Figure 3D:
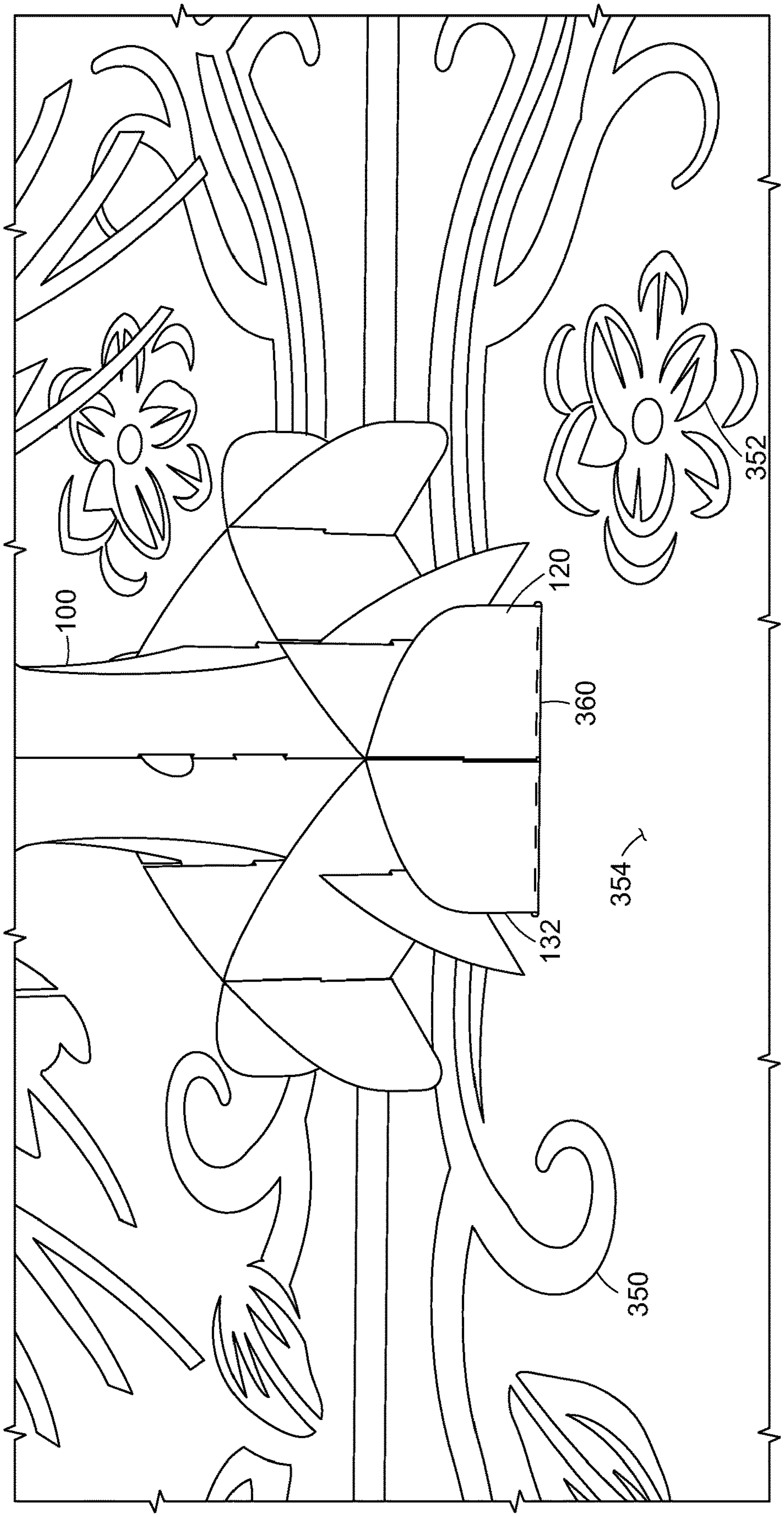

FIG. 3D shows that the tabs 302, 304 have been placed on, or secured to, a single sheet of paper 350 (visible through cutouts 352) of a greeting card. A second sheet of paper 354 has been placed on top of, and secured to, the single sheet of paper 350 such that the tabs are hidden under the second sheet of paper in the figure. There is a slit or orifice 360 in the second sheet of paper 354 that allows the remainder of the pop-up element 100 (such as 132, 120) to extend through the second sheet of paper and upwards. Cutouts 352 in the second sheet of paper 354 allow portions of the single sheet of paper 350 to show through the cutouts since the second sheet of paper 354 lies on top of the single sheet of paper. The tabs 302, 304 may secured to single sheet of paper 350 using adhesive or a fastener. Alternatively, the tabs 302, 304 may secured to the single sheet of paper 350 by virtue of the fact that the second sheet of paper 354 has been placed on top of, and secured to, the single sheet of paper 350, and the tabs 302, 304 are held between the papers 350, 354. Also, the second sheet of paper may be secured to the single sheet of paper 350 using adhesive or a fastener.

Figure 4A:
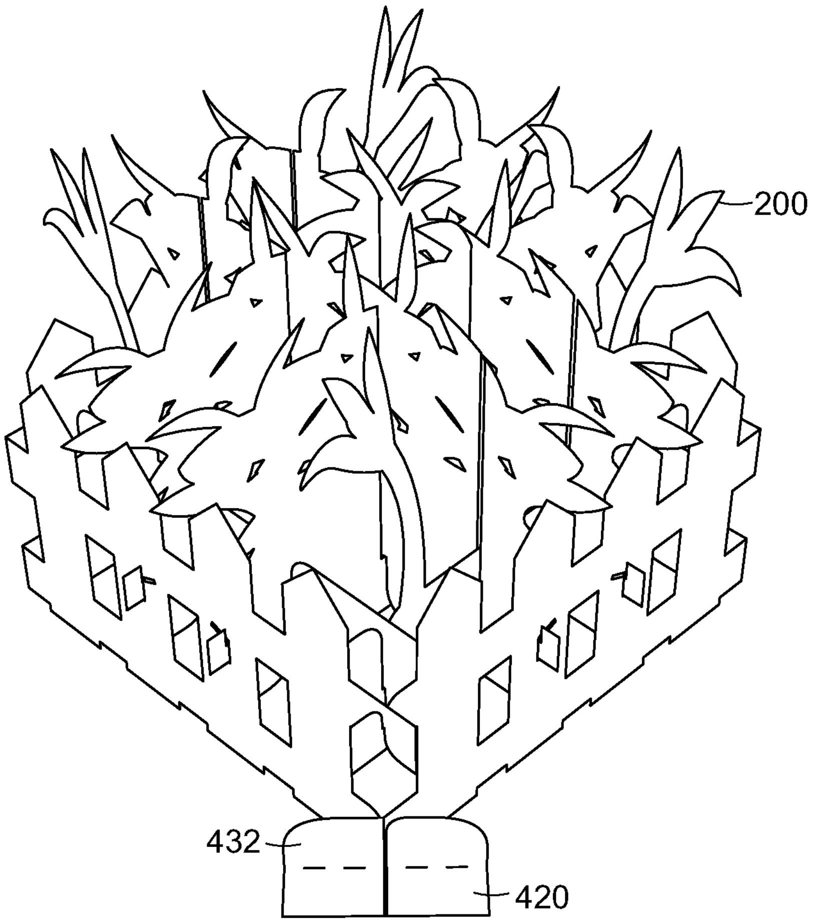
FIGS. 4A-4E depict the tab structures of the garden-like pop-up element, according to an example embodiment.
Figure 4B:
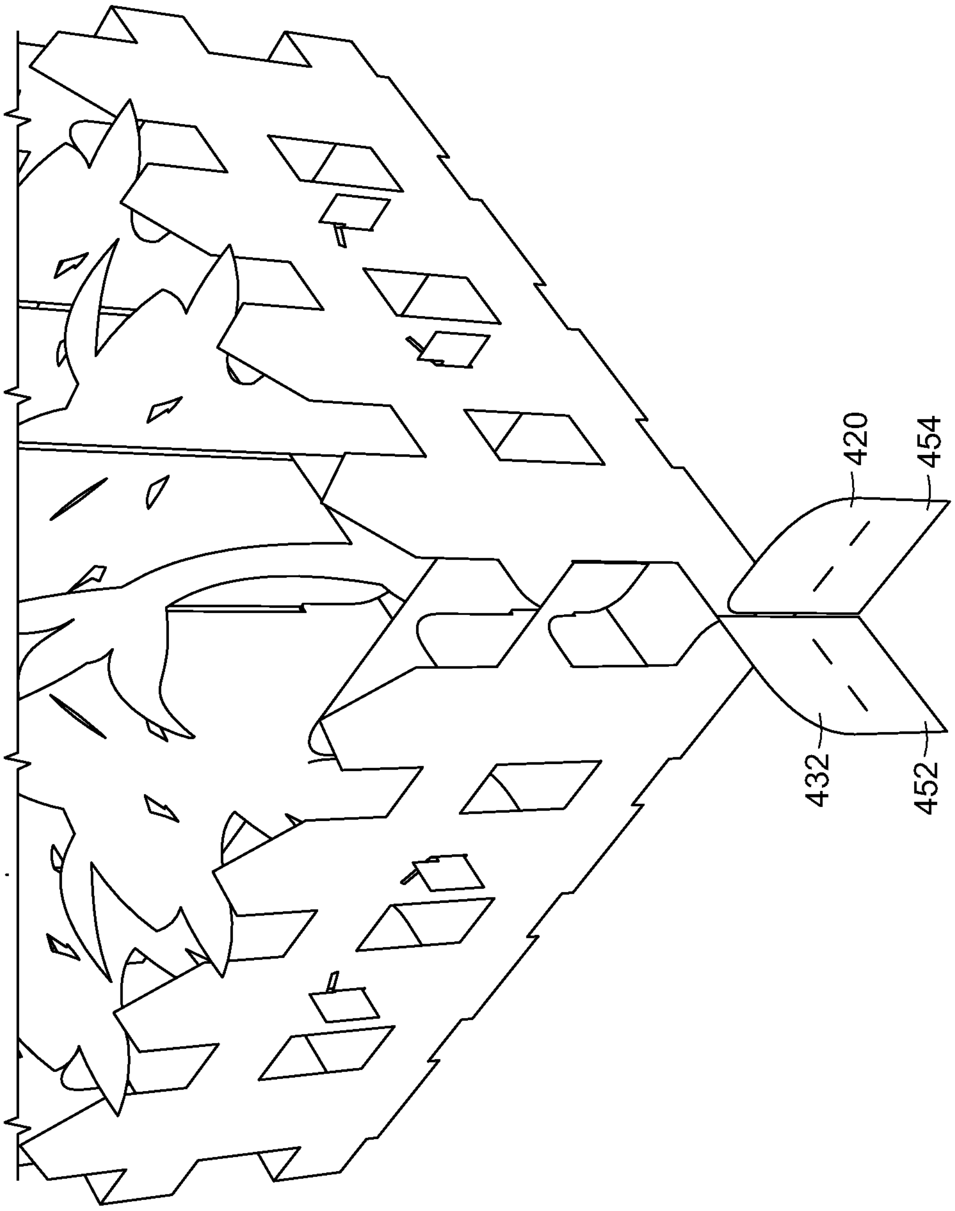
Figure 4C:
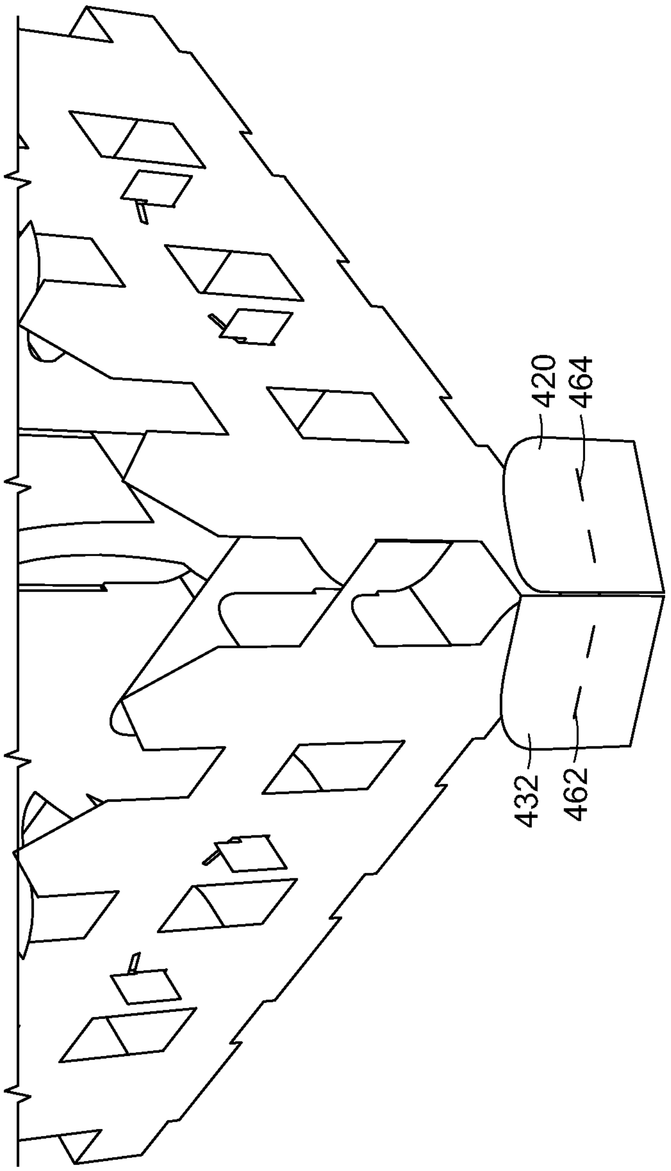

FIGS. 4A-4E depict the tab structures of the garden-like pop-up element 200, according to an example embodiment. FIG. 4A shows that when constructed, the first (or leftmost) slice-form element 420 does intersect with the last (or right-most) slice-form element 432 at a vertex that is located along an outer circumference of the garden-like pop-up element 200.

Figure 4D:
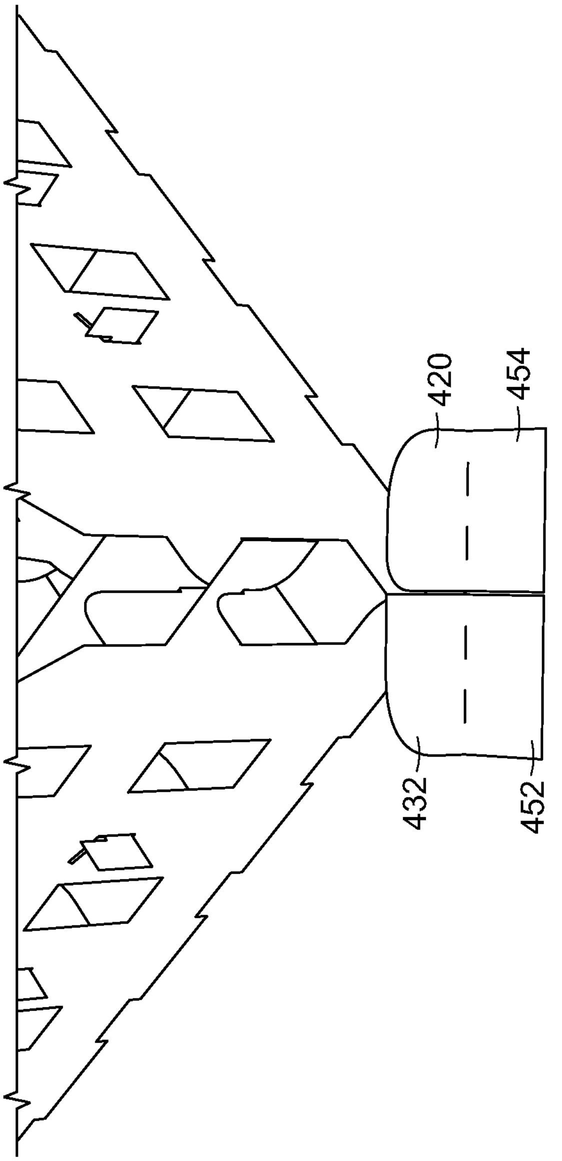

Note that the first (or left-most) slice-form element 420 includes a tab 454 that extends downwards and includes a crease 464. Also, the last (or right-most) slice-form element 432 includes a tab 452 that extends downwards and includes a crease 462. FIG. 4D shows that tab 454 has been folded along the crease 464 such that the tab is perpendicular to the first (or left-most) slice-form element 420. Also, tab 452 has been folded along crease 462 such that the tab is perpendicular to the last (or right-most) slice-form element 432.

Figure 4E:
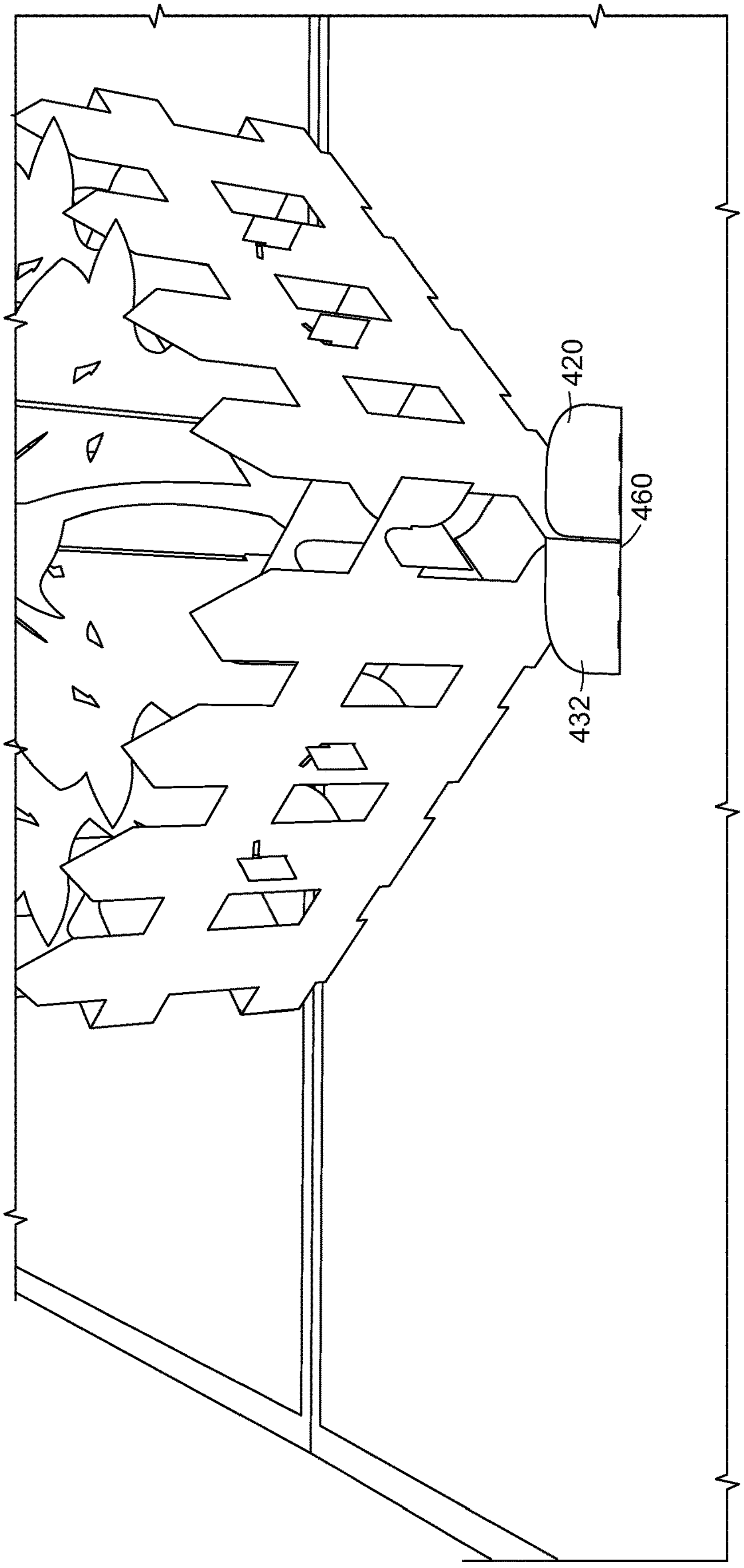

FIG. 4E shows that the tabs 302, 304 have been placed on, or secured to, a greeting card. A second sheet of paper has been placed on top of, and secured to, a single sheet of paper such that the tabs are hidden under the second sheet of paper in the figure. There is a slit or orifice 460 in the second sheet of paper that allows the remainder of the pop-up element 200 (such as 432, 420) to extend through the second sheet of paper and upwards.

Figure 5:
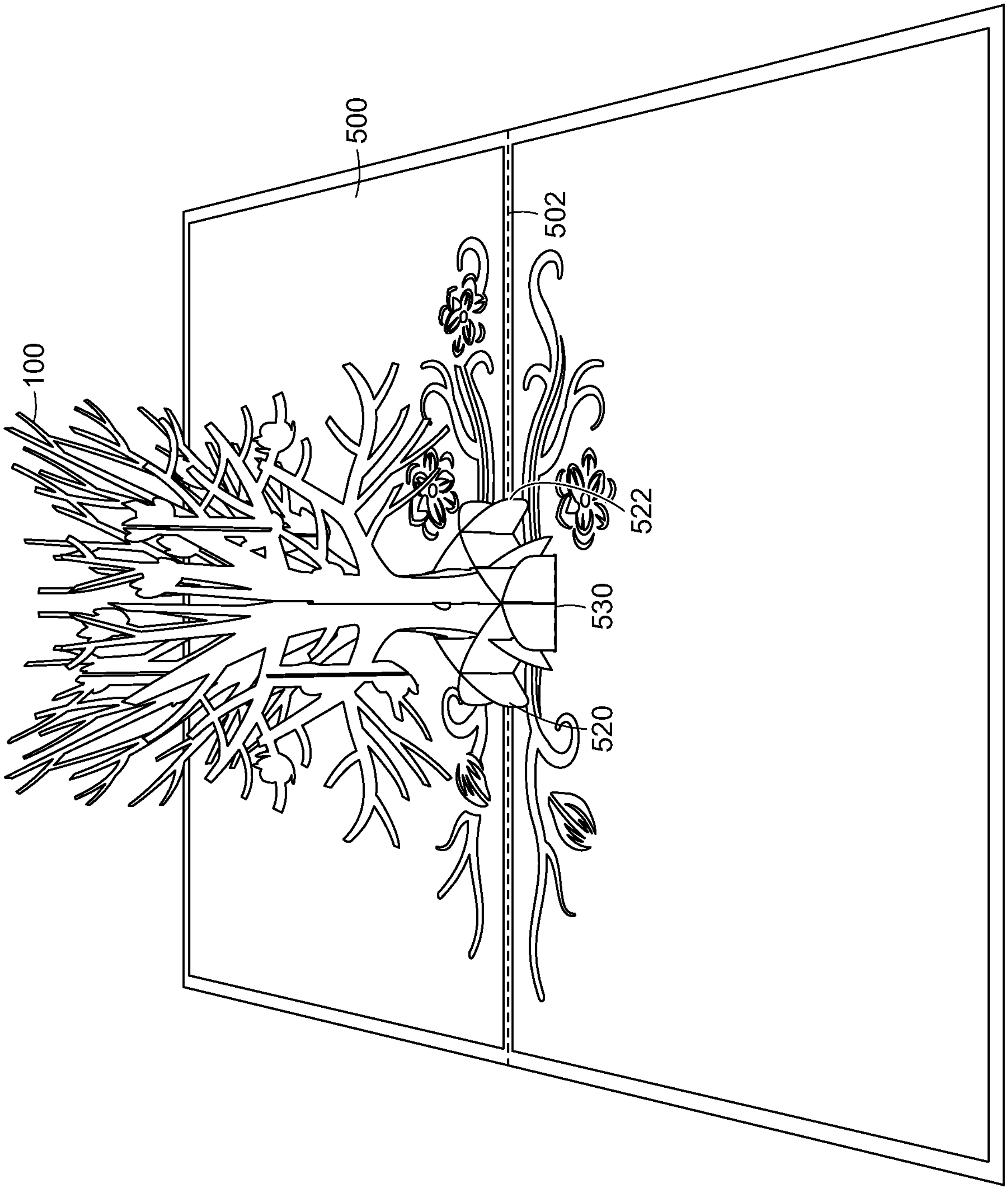
FIG. 5 depicts the placement of the tree-like pop-up element, according to an example embodiment.

FIG. 5 depicts the placement of the tree-like pop-up element 100 on a greeting card 500, according to an example embodiment. The greeting card 500 may comprise a single sheet of paper including a single crease 502 and separating the sheet of paper into a left panel and a right panel, wherein the sheet is in a fully closed position when folded along the crease (and the left panel meets the right panel), and wherein the sheet is in the fully open position when not folded along the crease (i.e., there is a 180-degree angle made between the left and right panels). In another embodiment, the greeting card 500 may comprise multiple sheets of paper. FIG. 5 shows that the tree-like pop-up element 100 includes various vertices, namely, opposing vertices 520 and 522 and vertex 530. Vertex 530 (and its opposing vertex not shown) may have a tab structure (and all components necessary therewith) as described above with reference to the vertices shown in FIGS. 3A and 4A. Vertices 520, 522 may not have the tab structure described above.

FIG. 5 shows that the tree-like pop-up element 100 is placed on a greeting card 500, wherein at least two opposing vertices (520, 522) of the pop-up slice-form element are located along the crease 502 of the card 500 when in the open position. This allows the element 100 to collapse into a flat configuration when the card 500 is folded along crease 502 and the left panel meets the right panel. In another embodiment, only one vertex of the pop-up slice-form element 100 is located along the crease 502 of the card 500 when in the open position.

Figure 6:
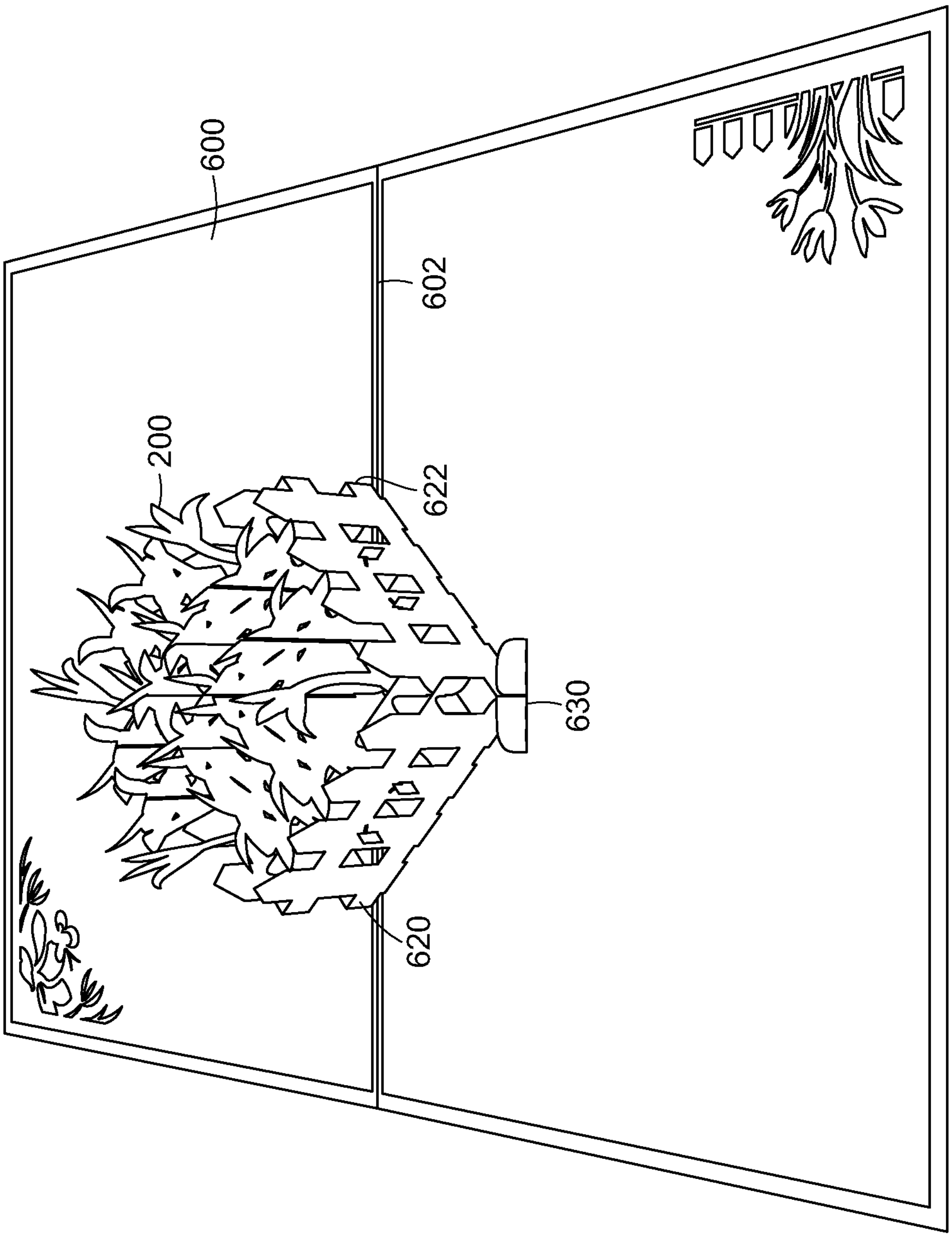
FIG. 6 depicts the placement of the garden-like pop-up element, according to an example embodiment.

FIG. 6 depicts the placement of the garden-like pop-up element 200, according to an example embodiment. FIG. 6 shows that the pop-up element 200 includes various vertices, namely, vertices opposing 620 and 622, and 630. Vertex 630 (and its opposing vertex not shown) may have a tab structure (and all components necessary therewith) as described above with reference to the vertices shown in FIGS. 3A and 4A. Vertices 620, 622 may not have the tab structure described above. FIG. 6 shows that the tree-like pop-up element 200 is placed on a greeting card 600, wherein at least two opposing vertices (620, 622) of the pop-up slice-form element are located along the crease 602 of the card 600 when in the open position. This allows the element 200 to collapse into a flat configuration when the card 600 is folded along crease 602 and the left panel meets the right panel. In another embodiment, only one vertex of the pop-up slice-form element 200 is located along the crease 602 of the card 600 when in the open position.

Figure 7A:
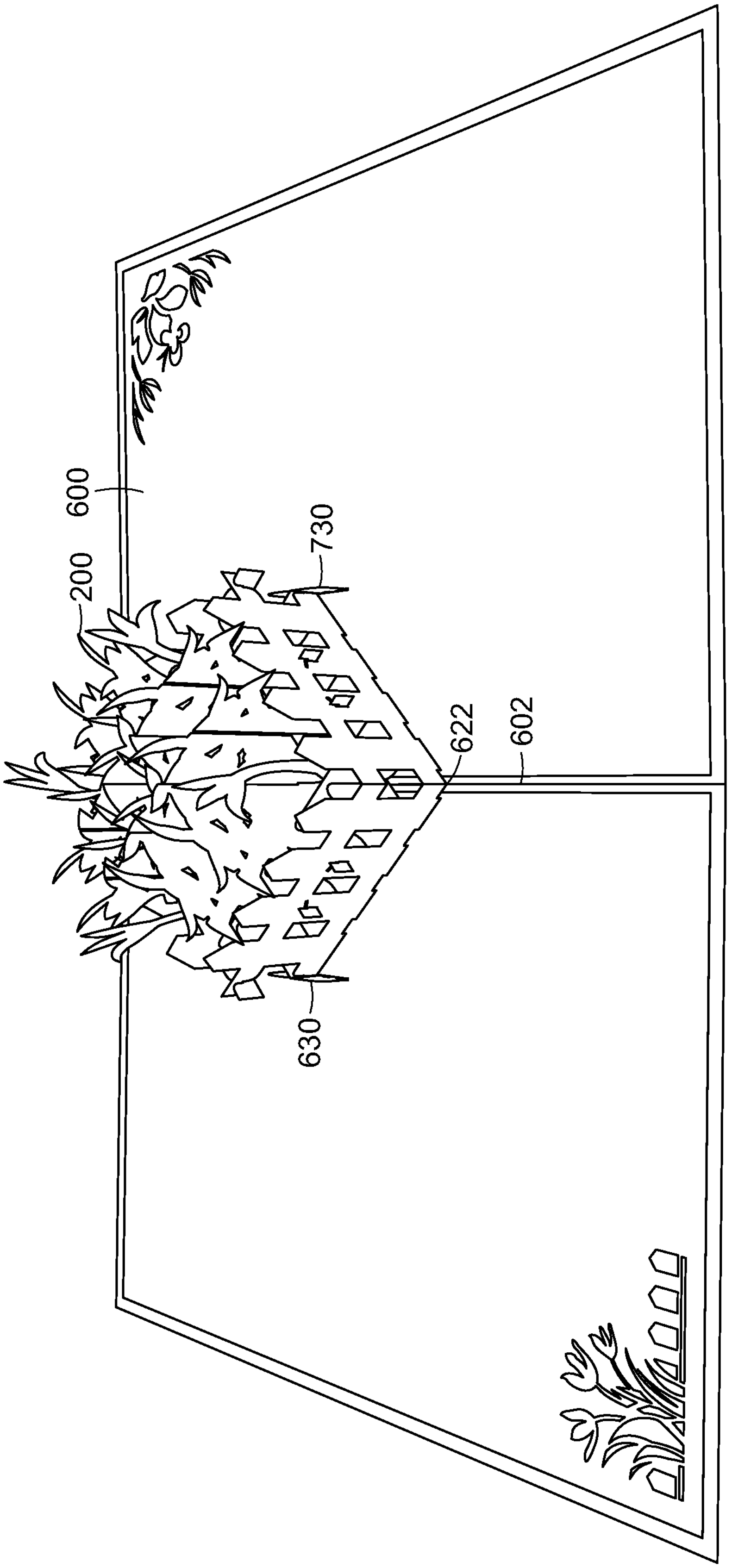
FIGS. 7A-7H depict the movement of the garden-like pop-up element between the opened and closed positions, according to an example embodiment.
Figure 7B:
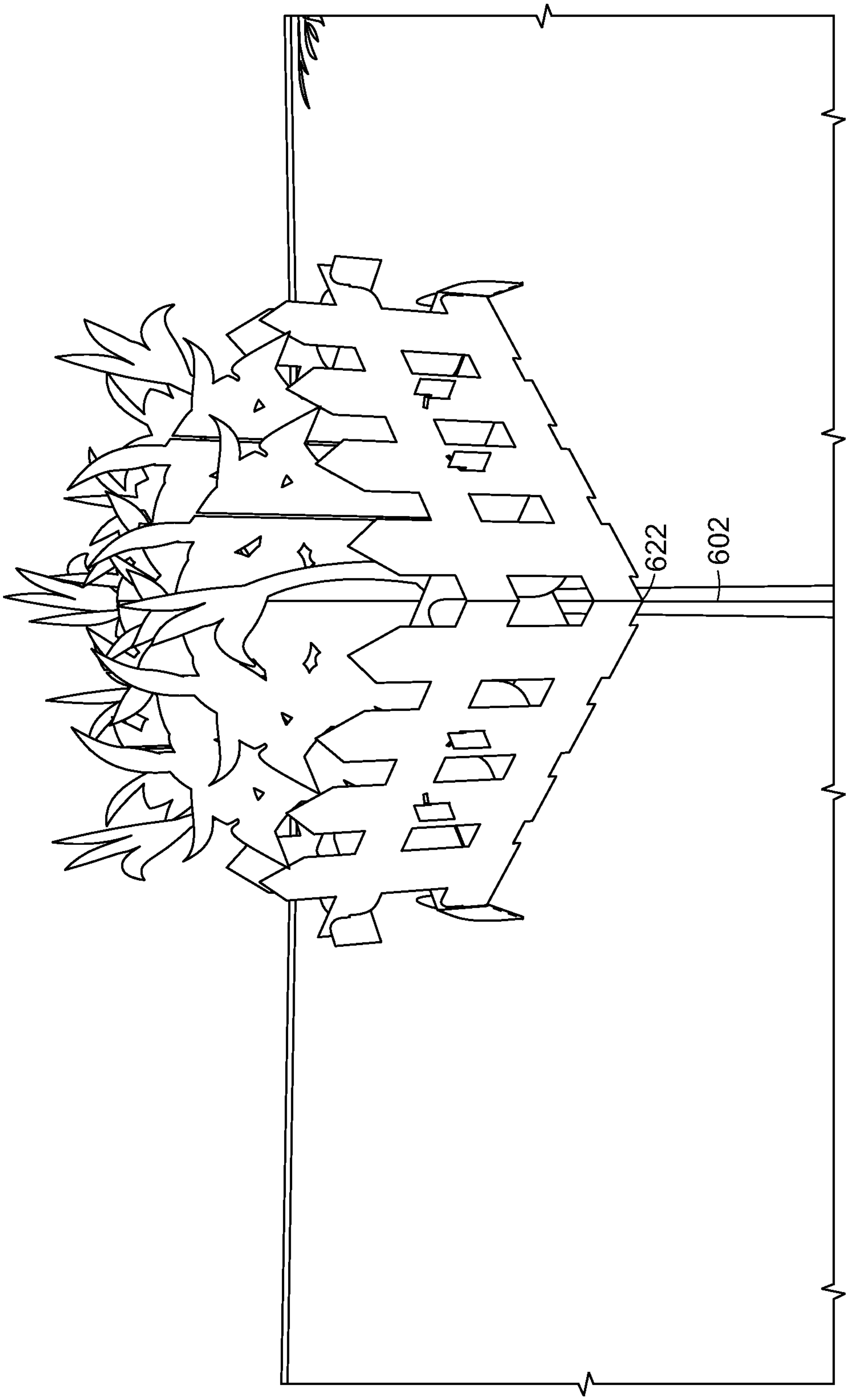

FIGS. 7A-7H depict the movement of the garden-like pop-up element 200 between the opened and closed positions, according to an example embodiment. FIG. 7A shows that the pop-up element 200 includes various vertices, namely, opposing vertices 630 and 730, and 622. Vertices 630 and 730 may have a tab structure (and all components necessary therewith) as described above with reference to the vertices shown in FIGS. 3A and 4A. Vertex 622 may not have the tab structure described above. FIG. 7A shows that the tree-like pop-up element 200 is placed on a greeting card 600, wherein vertex 622 is located along the crease 602 of the card 600 when in the open position.

Figure 7C:
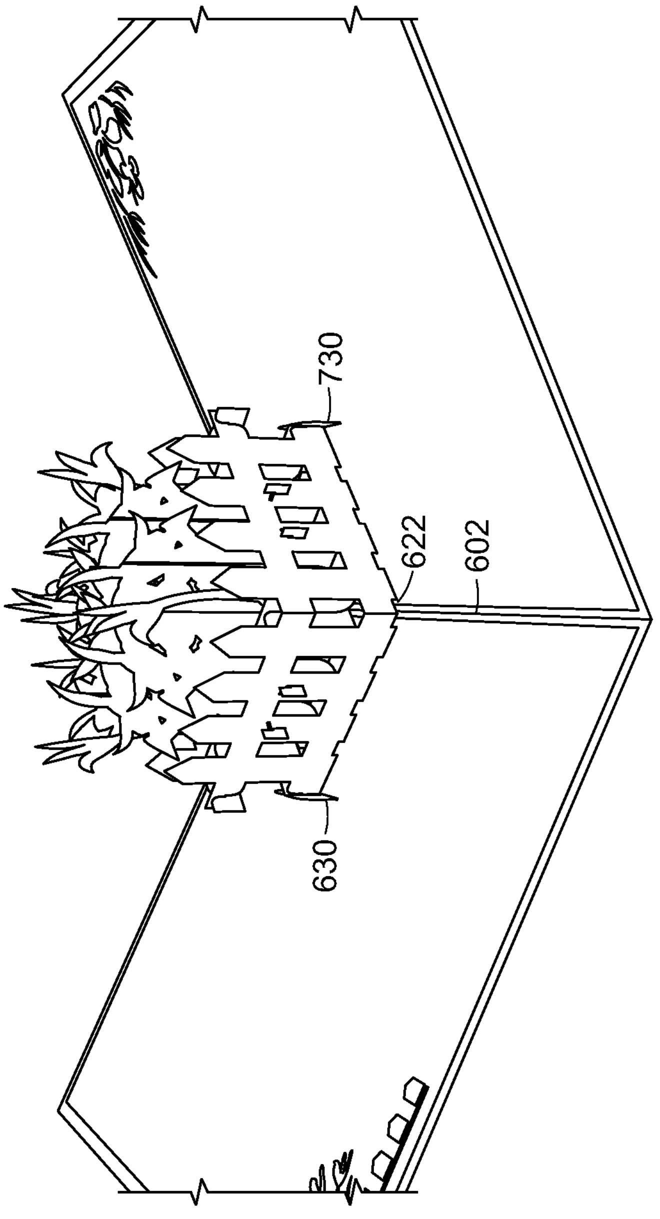
Figure 7D:
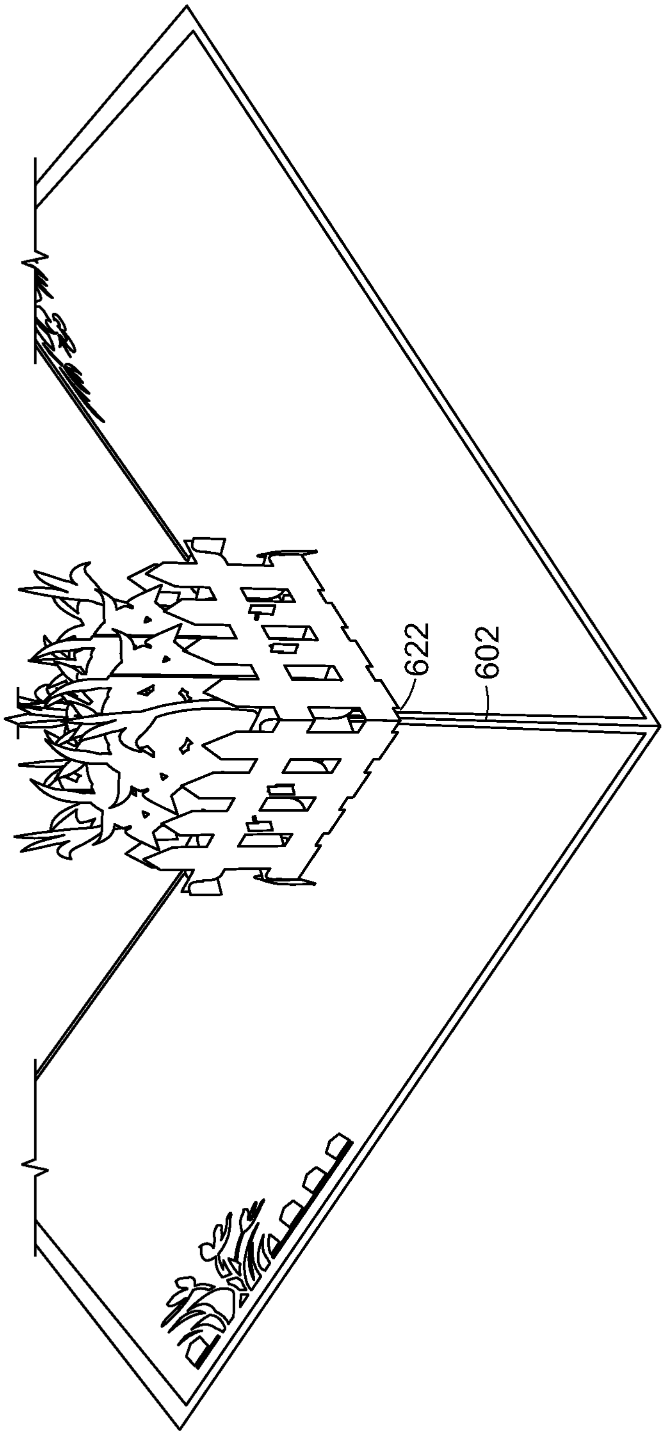
Figure 7E:
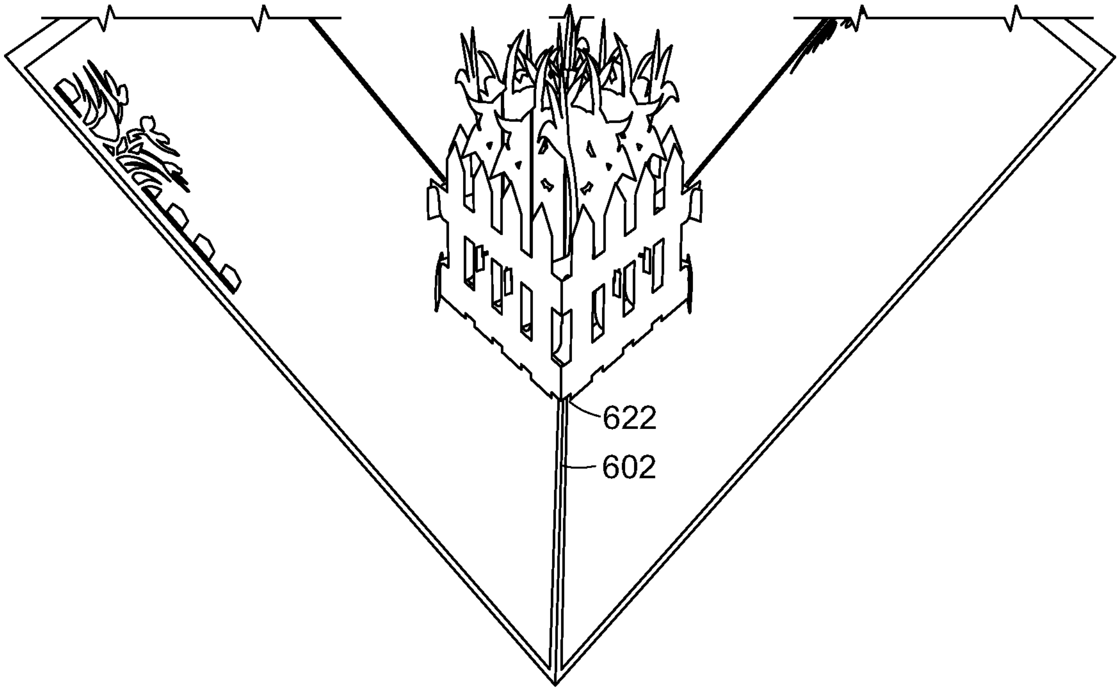
Figure 7F:
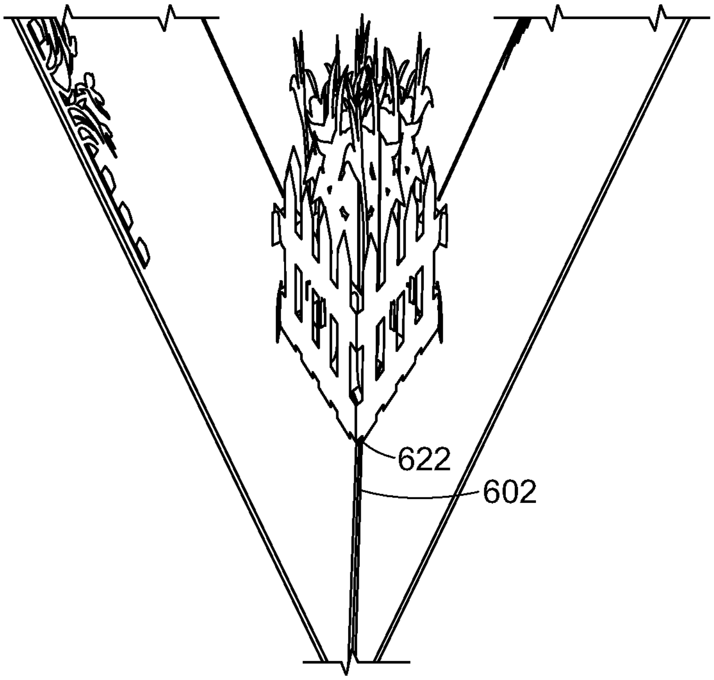
Figure 7G:
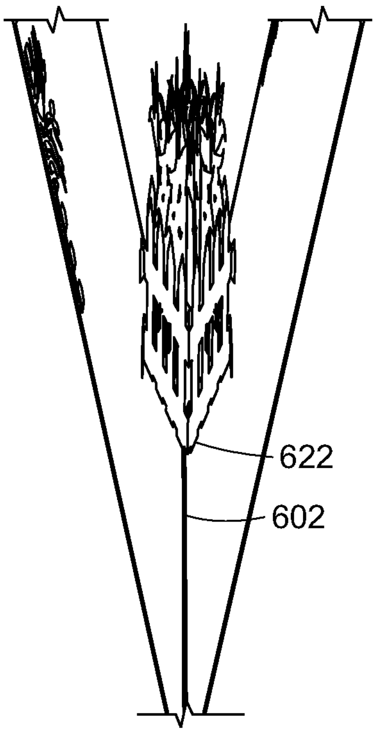
Figure 7H:
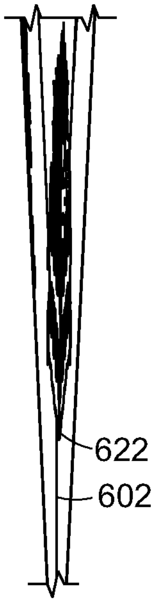

FIG. 7C shows the card 600 beginning movement from the fully open position to a closed position. As the angle between the left and right panels decreases from a 180-degree angle, one can see that the left panel places pressure on the vertex 630 and the right panel places pressure on the vertex 730, resulting in the garden-like pop-up element 200 starting to collapse from a three-dimensional configuration, to a flat configuration. FIGS. 7D through 7F show that as the left and right panels come closer together, the left panel continues to place pressure on the vertex 630 and the right panel continues to place pressure on the vertex 730, resulting in the garden-like pop-up element 200 continuing to collapse from a three-dimensional configuration, to a flat configuration. FIG. 7G shows that as the left panel has almost met the right panel, the garden-like pop-up element 200 is almost collapsed, while FIG. 7H shows that as the left panel has met the right panel, the garden-like pop-up element 200 has fully collapsed into a flat configuration.

In one embodiment, any of the sheets described above may comprise cardboard, wood, metal, or plastic, as well as all types of paper. Likewise, in one embodiment, any of the plurality of slice-form elements described above may comprise cardboard, wood, metal, or plastic, as well as all types of paper. In another embodiment, any of the sheets described above, as well as any of the plurality of slice-form elements described above, may be formed from laser cutting. Laser cutting is a technology that uses a laser to cut materials.

Laser cutting directs the output of a high-power laser toward the material, which then either melts, burns, vaporizes away, or is blown away by a jet of gas, leaving an edge with a high-quality surface finish. The cutouts in the sheets described above may also be formed using laser cutting.

In yet another embodiment, any of the sheets described above may comprise print on any side. Printing is a process for reproducing text and images using a master form or template. Examples of printing process that may be used to deposit such print include flexography, dye-sublimation, inkjet, laser printing, pad printing, relief printing, screen printing, and thermal printing.

In one embodiment, the claimed subject matter describes an article comprising a popup card, the pop-up card comprising a single sheet of paper including a single crease and separating the sheet of paper into a left panel and a right panel, wherein the sheet is in a closed position when folded along the crease, and wherein the sheet is in the open position when not folded along the crease. The article also includes a pop-up slice-form element coupled to said sheet, wherein the slice-form includes a first plurality of slice-form elements perpendicular to a second plurality of slice-form elements when in the open position. The first plurality of slice-form elements comprises: a) a first slice-form element with a distal tab perpendicular to the first slice-form element when in the open position, wherein said tab is coupled to the left panel, and b) a last slice-form element with a distal tab perpendicular to the last slice form element when in the open position, and wherein said tab is coupled to the right panel. The second plurality of slice-form elements comprises: a) a first slice-form element with a distal tab perpendicular to the first slice-form element when in the open position, wherein said tab is coupled to the right panel, and b) a last slice form element with a distal tab perpendicular to the last slice-form element when in the open position, and wherein said tab is coupled to the left panel. When in the open position the pop-up slice-form element is displayed as a three-dimensional configuration, and in the closed position said pop-up slice-form element folds together into a flat configuration.

In another embodiment, the article further comprises a second sheet of paper coupled to a first side of the single sheet of paper in a parallel manner, such that the distal tabs of the slice-form elements are disposed between the single sheet of paper and the second sheet of paper. Further, the single sheet of paper includes cutouts through which the second sheet of paper is viewable.

In yet another embodiment, the article further comprises at least one tab attached to a top of one or more slice-form elements, wherein the tab is configured for attachment to a planar element, wherein in the open position the planar element is extended perpendicular to the single sheet of paper. The at least one tab may be configured to attach to a planar element, which may comprise a logo, a graphic design or other aesthetic element that is used to convey a message, a feeling or other communication.

Embodiments may be described above with reference to functions or acts, which comprise methods. The functions/acts noted above may occur out of the order as shown or described. For example, two functions/acts shown or described in succession may in fact be executed substantially concurrently or the functions/acts may sometimes be executed in the reverse order, depending upon the functionality/acts involved. While certain embodiments have been described, other embodiments may exist. Further, the disclosed methods' functions/acts may be modified in any manner, including by reordering functions/acts and/or inserting or deleting functions/acts, without departing from the spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A pop-up card, comprising:

a card foldable along a crease line defining a first section and a second section;

a self-erecting pop-up display structure including at least a first set of slice-form elements and a second set of slice-form elements;

a first tab corresponding to the first set of slice-form elements;

a second tab corresponding to the first set of slice-form elements;

a third tab corresponding to the second set of slice-form elements; and a fourth tab corresponding to the second set of slice-form elements, at least one of the first tab or the third tab securing the self-erecting pop-up display structure to the card at the first section, at least one of the second tab or the fourth tab securing the self-erecting pop-up display structure to the card at the second section, the self-erecting pop-up display structure being in a collapsed state when the card is in a folded position and in an erected state when the card is in an opened position.

2. The pop-up card of claim 1, wherein the first tab is disposed adjacent the third tab and the second tab is disposed adjacent the fourth tab.

3. The pop-up card of claim 1, wherein each of the first tab, the second tab, the third tab, and the fourth tab is oriented parallel to the crease line.

4. The pop-up card of claim 1, wherein the first set of slice-form elements and the second set of slice-form elements are oriented at an angle relative to the crease line.

5. The pop-up card of claim 1, wherein the first set of slice-form elements and the second set of slice-form elements interlock with each other in a pattern.

6. The pop-up card of claim 1, wherein the first set of slice-form elements is oriented at an angle to the second set of slice-form elements when the self-erecting pop-up display structure is in the erected state.

7. A pop-up card, comprising:

a card foldable along a crease line between an opened position and a folded position, the crease line defining a first section and a second section;

a self-erecting pop-up display structure including a first set of slice-form elements and a second set of slice-form elements;

a first set of tabs comprising a first tab and a second tab, at least one of the first tab or the second tab securing the self-erecting pop-up display structure to the card at the first section; and a second set of tabs comprising a third tab and a fourth tab, at least one of the third tab or the fourth tab securing the self-erecting pop-up display structure to the card at the second section, the self-erecting pop-up display structure being in a collapsed state when the card is in the folded position and in an erected state when the card is in the opened position.

8. The pop-up card of claim 7, wherein the first tab is disposed adjacent the third tab and the second tab is disposed adjacent the fourth tab.

9. The pop-up card of claim 7, wherein each of the first tab, the second tab, the third tab, and the fourth tab is oriented parallel to the crease line.

10. The pop-up card of claim 7, wherein the first set of slice-form elements and the second set of slice-form elements are oriented at an angle relative to the crease line.

11. The pop-up card of claim 7, wherein the first set of slice-form elements and the second set of slice-form elements interlock with each other in a pattern.

12. The pop-up card of claim 7, wherein the first set of slice-form elements is oriented at an angle to the second set of slice-form elements when the self-erecting pop-up display structure is in the erected state.

13. A pop-up card, comprising:

a card foldable along a crease line between an opened position and a folded position, the crease line defining a first section and a second section;

a self-erecting pop-up display structure including a first set of slice-form elements and a second set of slice-form elements;

a first tab of a first set of tabs securing the self-erecting pop-up display structure to the card at the first section; and a second tab of a second set of tabs securing the self-erecting pop-up display structure to the card at the second section, the self-erecting pop-up display structure being in a collapsed state when the card is in the folded position and in an erected state when the card is in the opened position.

14. The pop-up card of claim 13, wherein the first set of slice-form elements and the second set of slice-form elements interlock with each other in a pattern.

15. The pop-up card of claim 13, wherein the first set of slice-form elements is oriented at an angle to the second set of slice-form elements when the self-erecting pop-up display structure is in the erected state.

16. The pop-up card of claim 13, wherein the first set of slice-form elements is oriented parallel to the second set of slice-form elements when the self-erecting pop-up display structure is in the collapsed state.

17. The pop-up card of claim 13, wherein the self-erecting pop-up display structure includes a vertex disposed along the crease line.

18. The pop-up card of claim 17, wherein the vertex moves along the crease line as the self-erecting pop-up display structure moves between the erected state to the collapsed state.

19. The pop-up card of claim 13, wherein the first set of slice-form elements and the second set of slice-form elements are oriented at an angle relative to the crease line.

20. The pop-up card of claim 1, wherein a first panel covers at least a portion of the first tab and a second panel covers at least a portion of the second tab.

* * * * *